(12) United States Patent
Walisko et al.

(10) Patent No.: US 12,134,302 B2
(45) Date of Patent: Nov. 5, 2024

(54) DEVICE FOR DRIVING A COMPRESSOR, AND METHOD FOR MANUFACTURING THE DEVICE

(71) Applicant: Hanon Systems, Daejeon (KR)

(72) Inventors: David Walisko, Hürth (DE); Bernd Guntermann, Lennestadt (DE); Senol Gecgel, Cologne (DE)

(73) Assignee: HANON SYSTEMS, Daejeon (KR)

( * ) Notice: Subject to any disclaimer, the term of this patent is extended or adjusted under 35 U.S.C. 154(b) by 168 days.

(21) Appl. No.: 17/635,245

(22) PCT Filed: Nov. 30, 2020

(86) PCT No.: PCT/KR2020/017225
§ 371 (c)(1),
(2) Date: Feb. 14, 2022

(87) PCT Pub. No.: WO2021/118134
PCT Pub. Date: Jun. 17, 2021

(65) Prior Publication Data
US 2022/0324298 A1    Oct. 13, 2022

(30) Foreign Application Priority Data

Dec. 11, 2019   (DE) .................... 10 2019 133 998.7

(51) Int. Cl.
*B60H 1/32*     (2006.01)
*H02K 1/16*     (2006.01)
(Continued)

(52) U.S. Cl.
CPC ............. *B60H 1/3226* (2013.01); *H02K 1/16* (2013.01); *H02K 1/22* (2013.01); *H02K 3/04* (2013.01);
(Continued)

(58) Field of Classification Search
USPC ...................................................... 417/423.7
See application file for complete search history.

(56) References Cited

U.S. PATENT DOCUMENTS 3,223,043 A  *  12/1965  Shapiro ............... H02K 5/1282
                                                                417/370
8,310,126 B1     11/2012  Hopkins et al.
(Continued)

FOREIGN PATENT DOCUMENTS

DE         10239935 A1 *  3/2004    ............... H02K 3/50
DE     102018107280 A1   10/2018
(Continued)

OTHER PUBLICATIONS

Machine Translation DE10239935 (Obtained from USPTO Search) (Year: 2024).*

(Continued)

*Primary Examiner* — Dominick L Plakkoottam
*Assistant Examiner* — Geoffrey S Lee
(74) *Attorney, Agent, or Firm* — Shumaker, Loop & Kendrick, LLP; James D. Miller

(57) ABSTRACT

A device and a method for manufacturing the device for driving a compressor, in particular an electric motor, with a rotor and a stator with a stator core, which are arranged along a longitudinal axis. The stator exhibits connecting cables produced as sections of conducting wires of coils, and connection lines, that are arranged on a first end face of the stator, one insulation element whose wall that is produced essentially with a hollow-cylinder shape projects beyond the stator core on the first end face of the stator in the axial direction, as well as one cover element with mounting elements with connection passages for mounting plug-in connectors, which each are fully enclosed by a wall. A volume enclosed by the stator core, the cover element and
(Continued)

the wall of the insulation element which projects beyond the stator core is filled at least zonally with potting compound.

20 Claims, 2 Drawing Sheets

(51) Int. Cl.
 *H02K 1/22* (2006.01)
 *H02K 3/04* (2006.01)
 *H02K 5/04* (2006.01)
 *H02K 15/02* (2006.01)
(52) U.S. Cl.
 CPC ............... *H02K 5/04* (2013.01); *H02K 15/02* (2013.01); *B60H 2001/3292* (2013.01)

(56) References Cited

U.S. PATENT DOCUMENTS

| | | | |
|---|---|---|---|
| 11,258,326 B2* | 2/2022 | Guntermann | H02K 3/46 |
| 11,658,535 B2* | 5/2023 | Guntermann | H02K 3/46 |
| | | | 310/71 |
| 2003/0186592 A1* | 10/2003 | Potega | G01R 31/36 |
| | | | 374/E1.002 |
| 2003/0207603 A1* | 11/2003 | Potega | H01R 24/58 |
| | | | 439/578 |
| 2005/0214135 A1* | 9/2005 | Shibuya | F04D 29/0465 |
| | | | 417/357 |
| 2007/0077790 A1* | 4/2007 | Glasson | G01L 19/0084 |
| | | | 439/76.1 |
| 2007/0257572 A1 | 11/2007 | Nakano et al. | |
| 2009/0191074 A1* | 7/2009 | Suzuki | H02K 5/12 |
| | | | 417/423.7 |
| 2010/0158723 A1* | 6/2010 | Ihle | F04D 13/064 |
| | | | 310/194 |
| 2013/0101451 A1* | 4/2013 | Dickinson | F04D 25/0606 |
| | | | 417/423.7 |
| 2014/0099221 A1* | 4/2014 | Tanahashi | H02K 5/225 |
| | | | 417/423.7 |
| 2014/0363320 A1* | 12/2014 | Hayakawa | H02K 3/52 |
| | | | 417/420 |
| 2015/0167694 A1* | 6/2015 | Harada | F04D 1/04 |
| | | | 417/363 |
| 2015/0285253 A1* | 10/2015 | Jahnz | F04D 17/122 |
| | | | 310/71 |
| 2016/0197530 A1* | 7/2016 | Fujii | H02K 11/33 |
| | | | 310/71 |
| 2018/0183290 A1* | 6/2018 | Wüst | H02K 15/085 |
| 2018/0301908 A1* | 10/2018 | John | H01R 27/02 |
| 2018/0351428 A1* | 12/2018 | Okamoto | H02K 3/28 |
| 2019/0393750 A1* | 12/2019 | Guntermann | F04B 17/03 |
| 2022/0123618 A1* | 4/2022 | Guntermann | B60H 1/00428 |
| 2023/0375153 A1* | 11/2023 | Dir | B60Q 1/34 |

FOREIGN PATENT DOCUMENTS

| | | | | |
|---|---|---|---|---|
| JP | 2000209802 A | | 7/2000 | |
| JP | 2015012782 A | | 1/2015 | |
| JP | 2020010595 A | * | 1/2020 | ........... B23B 31/001 |
| KR | 20130032230 A | | 4/2013 | |
| WO | 2017138534 A1 | | 8/2017 | |

OTHER PUBLICATIONS

Machine Translation JP2020010595 (Obtained from USPTO Search) (Year: 2024).*

* cited by examiner

DEVICE FOR DRIVING A COMPRESSOR, AND METHOD FOR MANUFACTURING THE DEVICE

CROSS-REFERENCE TO RELATED PATENT APPLICATIONS

This patent application is a United States nation phase patent application based on PCT/KR2020/017225 filed on Nov. 30, 2020, which claims the benefit of German Patent Application No. 10 2019 133 998.7 filed on Dec. 11, 2019, the entire disclosures of which are hereby incorporated herein by reference.

TECHNICAL FIELD

The invention relates to a device for driving a compressor, in particular an electric motor, for compressing a vaporous fluid, specifically a refrigerant. The compressor can be used in a refrigerant circuit of a motor vehicle air-conditioning system. The device exhibits a rotor and a stator which extend along a common longitudinal axis. The stator exhibits connecting cables and connection lines that are produced as sections of conducting wires of coils.

BACKGROUND ART

Compressors for mobile applications known from prior art, in particular for motor vehicle air-conditioning systems, and used to convey refrigerant through a refrigerant circuit, which are also called refrigerant compressors, are often produced as piston compressors with variable displacement or as scroll compressors. The compressors are driven either via a pulley or electrically.

An electrically driven compressor exhibits, in addition to the electric motor for driving the appropriate compressing mechanism, an inverter for driving the electric motor. The inverter is used to convert the direct current from a motor vehicle battery into alternating current supplied to the electric motor via electrical connections.

Conventional electric motors of the electrically driven compressors are produced with a ring-shaped stator core with coils arranged thereon and a rotor, wherein the rotor is arranged inside the stator core. Rotor and stator are aligned on a common symmetry axis or rotational axis of the rotor and enclosed by a housing. To be able to reduce the mounting space inside the power vehicle, on the one hand and, on the other hand, to fix the stator in the housing, the clearances between the components of the electric motor, in particular between stator and housing, are very narrow.

The inverter exhibits plug connections for plug-in connectors for electrical connection to connections of the electric motor, which are produced as separate components and pins and electrically connected with connection lines of conducting wires of the coils of the stator. The connecting cables are routed along end faces of the stator core and in most cases not covered by a stator insulation against the housing of the motor. In addition, the clearance to components of the housing is often very narrow.

To be able to provide both an electrical connection and a high insulation resistance, e.g. between the connection lines of the conducting wires, the connection lines or conducting wires, also called phase conductors, are to be insulated electrically both from each other and from other electrically conductive components of the stator and of the motor housing. Areas of the connection lines of the individual phases of the electric motor as sections of the conducting wires of the coils, which are produced, in particular of enamelled copper wire, can be plastic-insulated.

Furthermore, depending on the voltage level, it can be required to provide sufficient insulation clearances between electrically conductive components, e.g. to avoid short-circuits arising from insufficient creepage distances and clearances. The insulation can also exhibit imperfections or porosities which arise during the manufacturing process and substantially reduce the insulation resistance, in particular pinholes, resulting in the risk of electrical flashover, in particular to components of the housing. If two of the copper wires each exhibiting an imperfection in the insulation are arranged side by side and the imperfections are positioned directly opposite one another or at least close to each other, the risk of an electrical flashover between the copper wires is very high.

In particular, the requirements in an electrically driven compressor are extremely high, in particular when operating it in the range of high voltage, e.g. up to 1,000 V. International standards, for example, require that the creepage distances and clearances between two conducting wires or to adjacent electrically conductive components are at least 10 mm to 14 mm for the specified voltage range. The insulation system for use at ultra-high voltages (abbreviated UHV) of at least 800 V for hermetically sealed electric motors for applications in air-conditioning systems installed inside a highly modern electric motor for extra-high voltages (abbreviated "EHV") of approximately 400 V, in which the shortest air gap between two coils is typically approximately 4 mm and the shortest creepage distance typically approximately 5 mm, is the greatest challenge in automotive engineering.

To be able to reach the required insulation clearances or insulation distances, the electric motors of the electrically driven compressors from prior state of the art require either sufficiently large distances between the connection lines of the conducting wires and further electrically conductive components of the compressor, or the areas of the connection lines of the conducting wires with insufficient distance to other electrically conductive components are to be fully encapsulated. With encapsulation of the connection lines, narrower clearances are also possible between the connection lines of the conducting wires and further electrically conductive components of the compressor compared to unencapsulated connection lines, depending on the voltage level. When using a motor with unencapsulated connection lines, a large mounting space is required by the motor and hence also for the electrically driven compressor.

SUMMARY

The task of the invention is to provide and improve a device for driving an electrically driven compressor of a vaporous fluid, in particular an electric motor. The device is to be designed such that the relevant requirements with reference to insulation coordination are also met for voltage levels of at least 800 V to 1,000 V wherein, in particular, the conducting wires or the connecting cables or connection lines of the conducting wires must be electrically insulated to each other and to adjacent electrically conductive components. The device must be designed such that it can be assembled in an easy and thus time-saving manner and is to exhibit as few individual components as possible and is also be easy to construct to be able to minimize e.g. the weight and the required space, as well as the manufacturing costs.

The task of the invention is solved by way of the objects with the features as disclosed herein.

The task of the invention is solved by way of a device according to the invention, used to drive a compressor of a vaporous fluid, in particular an electric motor. The device exhibits a rotor and a fixed stator with a stator core, which extend along a common longitudinal axis between two end faces.

The stator exhibits connecting cables and connection lines produced as sections of conducting wires of coils, which are arranged on a first end face of the stator, and is positioned preferably in the radial direction on an outer surface of the rotor, enclosing the rotor.

The conducting wires are produced preferably from enamelled and wound copper wire in the area of the coils, wherein ends of the conducting wires which are not wound are brought out from the corresponding winding as connecting cables or connection lines and each as magnetically inactive sections of the conducting wires. The connecting cables, e.g. for connection and for connecting coils of the same phase, are produced preferably merely enamelled in the area of the coils, similarly to the conducting wires in the area of the coils, whereas the connection lines, e.g. for electrical connection with connections of the electric motor, are in addition insulated preferably with a plastic jacket.

The stator exhibits an insulation element whose essentially hollow-cylinder-shaped, in particular hollow-circular-cylinder-shaped wall projects beyond the stator core on the first end face of the stator in the axial direction, wherein the connecting cables or the connection lines are arranged in the circumferential direction on the wall of the insulation element.

The term 'axial direction' in this context is to be understood as the direction of the longitudinal axis of the stator, which also corresponds to the longitudinal axis and rotational axis of the rotor. An end face aligned in the axial direction is arranged on a plane that extends vertically relative to the longitudinal axis.

Furthermore, according to the invention, the stator exhibits a cover element with mounting elements with connection passages, each enclosed around the perimeter by a wall, which are intended for mounting plug-in connectors. The cover element is on the first end face of the stator, covering the wall of the insulation element with the connecting cables or connection lines, which projects beyond the stator core, arranged in such a way that it is in contact with the stator core and fully encloses it on its perimeter.

According to the concept of the invention, a volume enclosed by the stator core, the cover element and the wall of the insulation element, which projects beyond the stator core, is filled at least zonally with potting compound.

The insulation element is arranged preferably in a radial direction in such a way that it is in contact with the inside of an outer wall of the stator core. The insulation element can be firmly connected to the stator core.

According to a further embodiment of the invention, the reversing sections of the conducting wires wound to produce coils, which are aligned in the direction of the first end face of the stator, are hidden by the cover element at least zonally and encapsulated with potting compound.

According to an advantageous embodiment of the invention, the cover element exhibits the form of a hollow circular cylinder that is aligned in the axial direction and is produced as a ring, preferably with a full closed perimeter, and with two axially aligned ring surfaces and one radially aligned ring surface.

The axially aligned ring surfaces arranged preferably on an outer radius and on an inner radius of the cover element are aligned parallel to each other and connected to one another via the radial ring surface. A further advantage of the invention is that the radially aligned ring surface is arranged on a plane that is aligned vertically relative to the longitudinal axis of the stator, and the axially aligned ring surfaces are arranged with their end faces connected one to another in such a way the cover element exhibits a U shape in a cross-section through the ring contour.

An end face of at least one axially aligned ring surface, in particular the ring surface arranged on the inner radius of the cover element, which is distally aligned towards the radially aligned ring surface, is in contact with the stator core. The volume produced between the ring surfaces that are connected to one another can be used to accommodate the potting compound. The ring surfaces are produced preferably closed around the full perimeter, wherein merely the radial ring surface exhibits a pass-through opening in the area of a wall of a connection passage.

The cover element is made preferably of an electrically insulating material. Thus, the cover element arranged on the stator core, also in combination with the potting compound, is intended in particular to ensure the required insulation clearances.

A further advantage of the invention is that the mounting elements for the plug-in connectors are integral parts of the cover element so that the cover element and the mounting elements are produced as a unit, in particular as a single-piece injection mould element.

According to a preferred embodiment of the invention, the connecting cables or the connection lines of the conducting wires are arranged in such a way that they are in contact with an outer surface of the wall of the insulation element and aligned essentially along the circumferential direction of the wall, wherein the outer side of the wall of the insulation element exhibits preferably at least one collar that in the circumferential direction is produced as a recess, in particular as a groove, and intended for mounting of one connecting cable or one connection line. The connecting cable or connection line of a conducting wire can be fully integrated into a collar.

'Full integration' is to be understood as arrangement of the connecting cable or of the connection line of the conducting wire in the collar, wherein the conducting wire is embedded in the collar over its full diameter. The conducting wire does not project beyond the collar in any point. The maximum diameter of the conducting wire is less than the depth of the collar or corresponds to the depth of the collar.

The at least one collar inside the wall of the insulation element is arranged preferably on a plane aligned vertically relative to the longitudinal axis of the stator. In the case of arrangements with at least two collars inside the wall of the insulation element, the collars are arranged preferably on a plane that is vertically aligned relative to the longitudinal axis of the stator and arranged with an appropriate distance to each other.

According to a further embodiment of the invention, the plug-in connectors are produced of an electrically conductive material, with a cylinder shape, in particular with a circular cylinder shape or pin-like, and carried through a connection passage of a mounting element of the cover element, which is enclosed by the wall, whereby preferably a slot that is produced with the shape of a hollow circular cylinder and intended for mounting a contact element and for accommodation of the potting compound, is provided between the wall of the mounting element and the plug-in connector.

According to a further preferred embodiment of the invention, one contact element each is produced as a hollowcircular-cylinder-shaped sleeve for mounting the plug-in connector. The contact element is arranged in such a way that it encloses the plug-in connector preferably with an inner surface of a lateral surface and establishes electrical contact.

A further advantage of the invention is that an outer diameter of the contact element corresponds essentially to an internal diameter of the wall of the connection passage plus a slot that is produced over the full perimeter and is intended for accommodation of the potting compound so that potting compound can be arranged between the contact element and the wall of the mounting element so as to be able to connect the contact element with the mounting element and thus with the cover element.

According to a further advantageous embodiment of the invention, the connection lines of the conducting wires of the coils are in each case, by way of the contact element, in electrically conductive contact at one end with a plug-in connector arranged inside the contact element, wherein the end of the conducting wire is in electrically conductive contact with the contact element, preferably on an end face of the contact element, which is aligned towards the stator.

The task of the invention is also solved by way of a method according to the invention for manufacturing the device for driving a compressor of a vaporous fluid, in particular an electric motor. The method exhibits the following steps to be observed when assembling the stator:

Arranging a stator core with an insulation element and conducting wires wound to produce coils and with connecting cables and connection lines, wherein the connecting cables and the connection lines are arranged on a wall of the insulation element, which projects beyond the stator core in an axial direction;

Arranging a cover element with mounting elements, each produced with connection passages that are fully enclosed by a wall on an end face of the stator core aligned in the axial direction, wherein the connection passages are produced with one contact element each, which is each electrically connected to a connection line of a conducting wire, and one plug-connector each is inserted into each of the contact elements, as well as At least zonally filling of a volume produced between the stator core, the cover element and the insulation element, as well as between the walls of the mounting elements and the contact elements, with potting compound, and Arranging a rotor and a stator on a common longitudinal axis, wherein the stator encloses the rotor in the radial direction.

Furthermore, a special advantage of the invention is that a volume produced as a coherent hollow space facilitates grouting with the potting compound as a single process step.

According to a further embodiment of the invention, a volume enclosed by the cover element and by the reversing sections of the conducting wires wound to produce the coils and aligned in the direction of the end face of the stator is at least zonally filled with potting compound during the process of filling, wherein the volumes produced between the stator core, the cover element and the insulation element, as well as between the wall of the mounting elements and the contact elements, and the volume enclosed by the cover element and the reversing sections of the conducting wires wound to produce the coils and aligned in the direction of the end face of the stator are produced as a coherent unit.

The advantageous embodiment of the invention allows the use of the device for driving a compressor, in particular of an electric motor, for compressing a vaporous fluid for a compressor of a refrigerant in a refrigerant circuit of a motor vehicle air-conditioning system.

The device according to the invention for driving a compressor of a vaporous fluid with a minimal number of required components and the method for manufacturing the device in summary exhibit various further advantages:

Ease of assembly and ease of fixing of the cover element on the insulation element or stator core, with best possible electrical insulation of the connecting cables and connection lines of the conducting wires, in particular by encapsulating the cover element by way of filling the U section with potting compound, wherein the connecting cables, connection lines, in particular with the connections on the contact elements, and all further electrically conductive connections arranged inside the volume enclosed by the cover element and the stator core are insulated from each other and hermetically against the environment in one process step; furthermore, complete insulation of the current-carrying connections from the refrigerant, and thus minimal degree of contamination inside the encapsulated areas;

Increasing the insulation resistances and reducing the footprint, depending on the voltage level, including also insulation of the electrical plug connections between plug-in connectors and contact elements;

Avoiding the occurrence of short-circuit currents between the conducting wires and further electrically conductive, inactive components by providing the required insulation distances, depending on the voltage level;

Reducing the scrap in manufacturing due to insufficient insulation resistance, resulting in minimal costs, as well as Maximizing the service life of the compressor.

With a single step of assembly for the cover element, in particular magnetically inactive connections between the coils or conducting wires, in particular connection lines of the conducting wires, specifically of the connecting cables, are fully covered to be able to enlarge the insulation clearance and thus to increase the insulation resistance. Furthermore, the end face of the stator which is aligned towards the housing of the motor is mechanically reinforced, which has a positive effect on the shrinking process of the stator in the housing.

BRIEF DESCRIPTION OF DRAWINGS

Further details, features and advantages of embodiments of the invention result from the following description of examples of embodiment with reference to the corresponding drawings. The illustrations show the following.

DETAILED DESCRIPTION OF AN EMBODIMENT

Figure 1A:
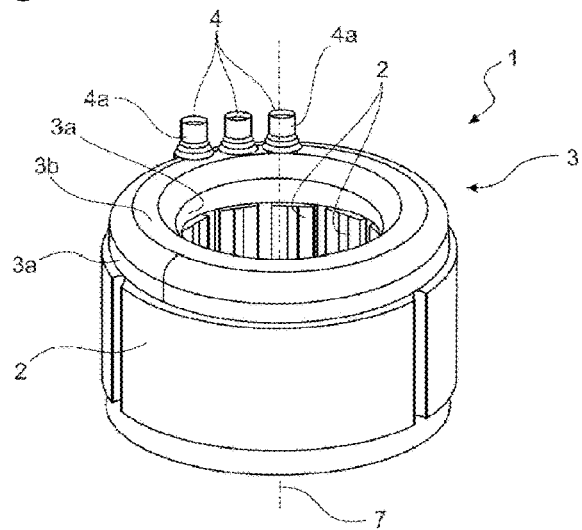
FIG. 1A: A stator of an electric motor as a device for driving a compressor of a vaporous fluid, which is provided with a stator core and a cover element arranged on a first end face of the stator, and with mounting elements for mounting plug-in connectors, in a perspective representation.
Figure 1B:
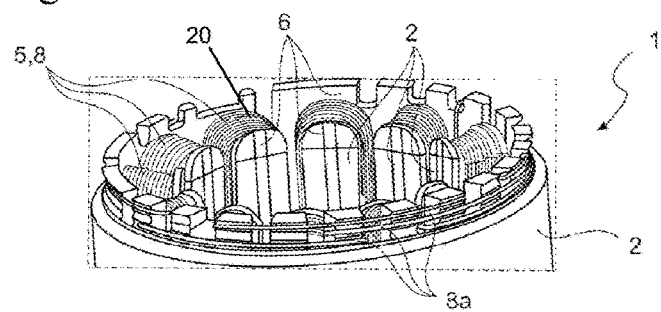
FIGS. 1B and 1C: A detail view each of the first end face of the stator without cover element in a perspective representation.
Figure 1C:
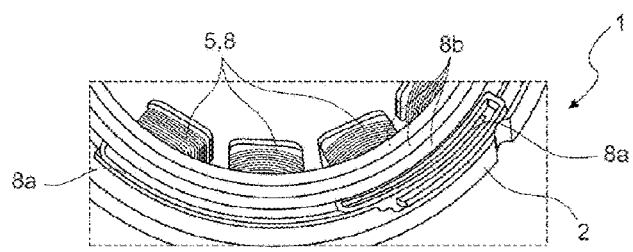
Figure 1D:
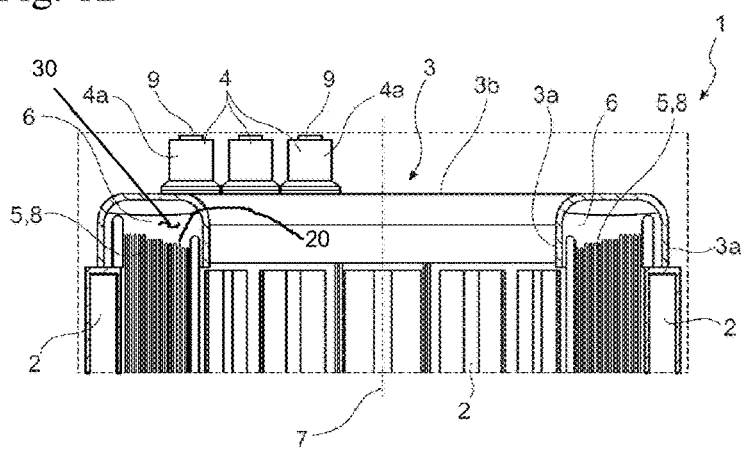
FIG. 1D: A detail view of the stator from FIG. 1a with cover element in a cross-sectional view.

FIG. 1A shows a stator 1 of an electric motor as a device for driving a compressor of a vaporous fluid, specifically for a motor vehicle air-conditioning system, for conveying refrigerant through a refrigerant circuit, in a perspective view. The stator 1 is shown with a stator core 2 and a cover element 3 that is arranged on a first end face of the stator 1 and fitted with mounting elements 4 for mounting plug-in connectors in a perspective representation. FIGS. 1B and 1C are each a detail view of the first end face of the stator 1 with the coils 5 arranged on the stator core 2 without cover element in a perspective representation, whereas FIG. 1D shows a detail view of the stator 1 from FIG. 1A with the cover element 3 in a cross-sectional view.

The electric motor, e.g. an AC motor with three phases, exhibits a rotor that is not represented and the stator core 2 that is arranged in the radial direction on an outer surface of the rotor and thus around the rotor. The stator core 2, that is produced preferably as a stack of sheets, and an insulation element 6, that is produced of an electrically insulating material, extend along a longitudinal axis 7 that also corresponds to the longitudinal axis of the stator 1 and the rotational axis of the rotor, from the first end face to a second end face of the stator 1. The insulation element 6 is produced preferably as an overmould of the stator core 2 and thus as a single-piece component.

The coils 5 consist of one wire each that is also called conducting wire 8 and produced as an electrical conductor and wound around an area of the stator core 2, which extends inside in the radial direction, wherein the all conducting wires 8 are produced from enamelled copper wire. The ends of the conducting wires 8 which are not wound are brought out from the corresponding winding as connecting cables 8a or connection lines 8b, each being magnetically inactive sections.

The connecting cables 8a that serve for connecting coils 5 of the same phase with each other are produced as first sections of the conducting wires 8 exclusively as enamelled wires, whereas the connection lines 8b configured for electrical connection to the connections of the electric motor as second sections of the conducting wires 8 are additionally insulated preferably with a plastic material.

The areas of the stator core 2 extending inwards in the radial direction exhibit the form of a web and are evenly distributed around the perimeter of an outer wall of the stator core 2. The insulation element 6, that insulates the stator core 2 and the conducting wires 8 of the coils 5 from each other electrically, is arranged between the conducting wires 8 of the coils 5 and the corresponding areas of the stator core 2. The insulation element 6 is produced as an extended element in the axial direction on the ends of the webs aligned inwards and in the axial direction. The reversing sections 20 of the insulation element 6 which project in the way as described above serve for fixing the conducting wires 8 of the coils 5, which are wound around the webs of the stator core 2.

The stator core 2, the coils 5 and the insulation element 6 form the stator unit of the electric motor.

The insulation element 6, that is produced preferably as an overmould of the stator core 2, is in the radial direction in contact with the inside of the outer wall of the stator core 2 with an outer lateral surface. The wall of the insulation element 6 projects beyond the stator core 2 on the end faces of the stator 1 in the axial direction, as shown, in particular in FIGS. 1B and 1C. The magnetically active sections of the conducting wires 8, that are wound to produce coils, are arranged around the areas of the insulation element 6, which extend inwards in the radial direction, wherein the insulation element 6 is arranged between the stator core 2 and the conducting wire 8 of the coils 5.

The area of the insulation element 6 which projects beyond the stator core 2 exhibits a wall that extends in the radial direction, is produced essentially with a hollow-cylinder shape and is interrupted in the circumferential direction. The sections of the conducting wires 8, which are magnetically inactive and not wound to produce coils and are routed as connecting cables 8a between the windings of the coils 5, are arranged in such a way that they run around the whole perimeter in the area of the insulation element 6, which projects beyond the stator core 2, and are integrated into the collars produced in the form of a groove. In addition, the magnetically inactive sections of the conducting wires 8, that are produced as connection lines 8b, can also be arranged inside such collars, also called mounting areas. The area of the insulation element 6 with the magnetically inactive sections of the conducting wires 8, which projects on the first end face of the stator 1 beyond the stator core 2, is also called connection ring.

Depending on the voltage level of the motor, it is imperative to observe the relevant clearances, also called insulation distances, in accordance with the relevant standards between the conducting wires 8 and other electrically conductive, metal components of the motor, such as the housing, or components of the compressor, to be able e.g. to avoid short-circuits or flashovers between the conducting wires 8 and adjacent electrically conductive components. Thanks to installation of the cover element 3, the insulation clearances are extended, compared to the insulation clearances without cover element, reducing the risk of short-circuits or flashovers.

The cover element 3 with the mounting elements 4 with connection passages 40, that are fully enclosed by a wall 4a and intended for mounting plug-in connectors, as shown in FIG. 1D, is arranged on the first end face of the stator 1, covering the wall of the insulation element 6, which projects beyond the stator core 2 in the axial direction.

In a state when the stator 1 is fitted, the cover element 3, that is produced in the form of a ring around the longitudinal axis 7, is in the axial direction in full-area contact with the stator 1, in particular with the stator core 2, wherein the outer diameter of the cover element 3 is smaller than the outer diameter of the stator core 2. The mounting elements 4 for the plug-in connectors 9 are integral parts of the cover element 3 so that the cover element 3 and the mounting elements 4 are produced as a unit, in particular as a single-piece injection mould element. The single-piece form is realized in a shaping process.

The cover element 3 produced as an axially aligned ring, that is closed around its full circumference and produced essentially with a cylinder shape, in particular with the shape of a hollow cylinder, specifically the shape of a hollow circular cylinder, exhibits two axially aligned ring surfaces 3a and one radially aligned ring surface 3b. The axial ring surfaces 3a, that are produced on the outer radius and on the inner radius of the cover element 3, are aligned parallel to each other and connected to one another via the radial ring surface 3b. The radial ring surface 3b, that is arranged on a plane aligned vertically relative to the longitudinal axis 7, connects the axial ring surfaces 3a to one another in such a way that the cover element 3 exhibits a U shape in a cross-section through the ring contour, preferably with like leg lengths. A first of the axial ring surfaces 3a is produced as an outer wall, whereas a second of the axial ring surfaces 3a is produced as an inner wall. The radial ring surface 3b connects the axial ring surfaces 3a on their end faces to one another. The ring surfaces 3a, 3b are each produced as surfaces that are closed around the full circumference, wherein the radial ring surface 3b is only interrupted in the area of the walls 4a of the connection passages 40 to be able to mount the plug-in connectors 9.

The volume produced between the ring surfaces 3a, 3b serves for accommodation of the area of the insulation element 6, which projects beyond the stator core 2, with the connecting cables 8a and connection lines 8b of the conducting wires 8, which are arranged thereon, and thus for accommodation of the connection ring and as mould for accommodation of the potting compound, wherein the cover element 3, produced with an essentially hollow cylinder shape, is arranged with an inner surface of the first axial ring surface 3a produced as an outer wall, and an outer surface of the second axial ring surface 3a, produced as an inner wall each in the direction of a lateral surface of the wall of the area of the insulation element 6, which projects beyond the stator core 2.

The cover element 3 covers, in particular, the sections of the enamelled connecting cables 8a, that are not wound to produce coils and are brought out from the corresponding windings or brought in into the corresponding windings, and the connection lines 8b of the conducting wires 8, as well as the reversing sections 20 of the conducting wires 8, that are wound to produce the coils 5 and aligned towards the first end face of the stator 1, towards the environment of the stator 1. In particular, the connecting cables 8a and the connection lines 8b of the conducting wires 8 are arranged in the radial direction in such a way that they are protected between the insulation element 6 and the cover element 3. Since the cover element 3 and also the insulation element 6 are electrically insulating components, the conducting wires 8, produced in the insulation element 6 and covered by the cover element 3, are fully enclosed by an electrical insulation.

The cover element 3 is intended to provide the insulation clearances to other electrically conductive components, such as the housing of the motor, or the required insulation resistances, in particular by way of an enlarged creepage distance, depending on the voltage level, against the housing of the motor, for example.

The volume produced as a hollow space and enclosed by the ring surfaces 3a, 3b of the cover element 3 and the connection ring, as well as the reversing sections 20 of the conducting wires 8 that are wound to produce the coils 5 and aligned in the direction of the first end face of the stator 1 is at least zonally filled or grouted with potting compound so that the insulation element 6 and the cover element 3 are firmly and inseparably connected with the conducting wires 8 arranged between them.

With grouting of the volume or hollow space with potting compound as an additional adhesive, so-called cemented connections are produced to be able to close any gaps for current flow and thus possible flow paths for leakage current or creeping current, wherein the cover element 3, the insulation element 6 and the connecting cables 8a and connection lines 8b arranged thereon are connected to one another, in particular cemented, to avoid creepage distances between adjacent components and, in particular to extend the creepage distances between electrically conductive elements to the minimum required.

A cemented connection is hence to be understood as connecting two materials by way of an appropriate adhesive, such as a glue, resin, epoxy or other grouting material that prevents current flow between two electrically conductive components.

The cover element 3 consequently serves, in addition to the protection of the connection ring, also as a mould for the potting compound that separates the conducting wires 8 of different phases from each other. Due to the fact that the conducting wires 8 are arranged with very narrow clearances to each other, the required creepage distances and clearances are ensured by grouting the entire hollow space produced between the wall of the insulation element 6, which projects beyond the stator core 2, and the cover element 3, by way of the potting compound, with the conducting wires 8 embedded therein. Thus, for example, an insulation system is provided which meets the requirements placed on applications with ultra-high voltages of at least 800 V.

With covering of the insulation element 6, that projects on the end face of the stator 1 beyond the stator core 2, by way of the cover element 3 and the potting compound, in addition, complete hermetical sealing of the conducting wires 8, that are arranged on the connection ring, is provided against the refrigerant as a fluid flowing inside the housing of the electric motor and between the conducting wires 8.

After installation of the electric motor or of the compressor, especially during operation, self-detaching of the connection of cover element 3 and insulation element 6 is excluded. The cover element 3 is connected with the insulation element 6 as firmly as in particular during operation the components cannot be separated without force, e.g. detached due to vibrations.

Figure 2A:
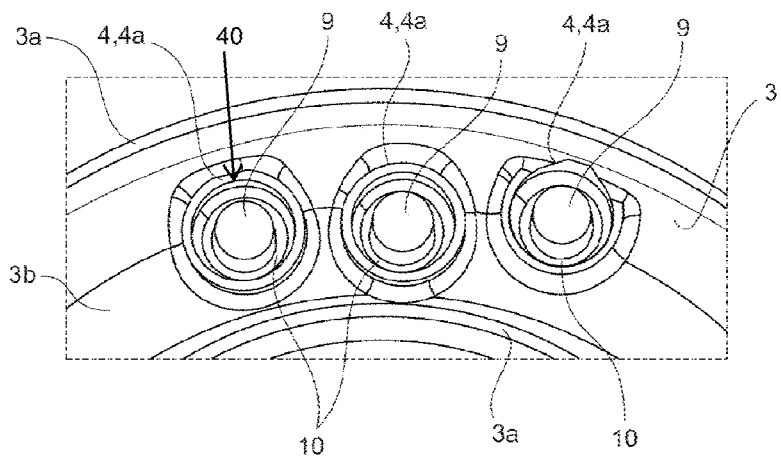
FIGS. 2A and 2B: The cover element with plug-in connectors inserted into the mounting elements in a detail representation and, in addition, with connection lines, each in a top view.
Figure 2B:
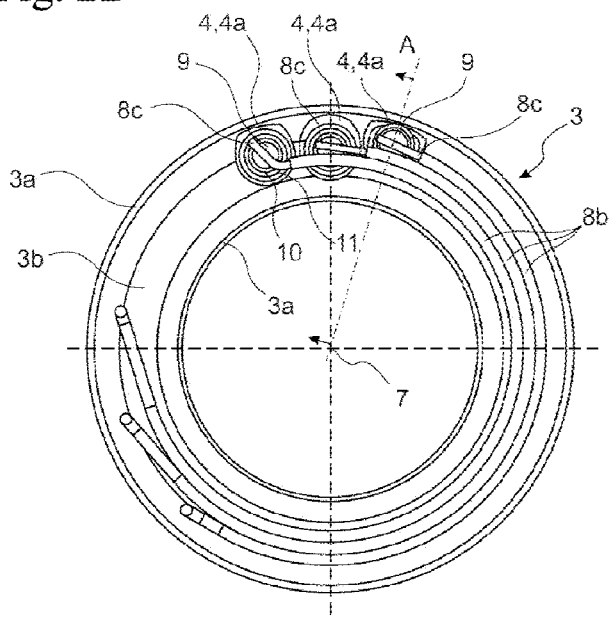
Figure 2C:
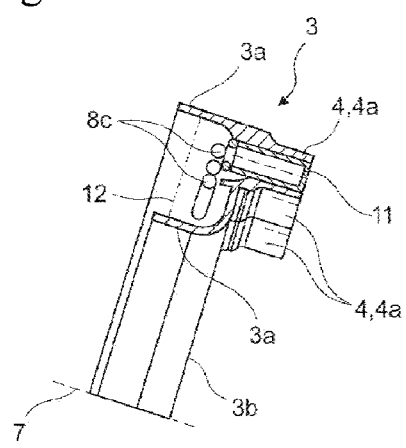
FIG. 2C: The cover element in a cross-sectional view through a mounting element for insertion of the plug-in connector.

FIGS. 2A and 2B show the cover element 3 with the plug-in connectors 9 inserted into the mounting elements 4 in a detail representation, as well as the connection lines 8b each in a top view, whereas FIG. 2C shows the cover element 3 in a cross-sectional view through a mounting element 4 for inserting the plug-in connector 9. The conducting wires 8 of each of the phases are connected to the inverter separately by way of the plug-in connectors 9 as electrical connection elements between stator 1 and the inverter.

The pin-like plug-connectors 9 that are produced of an electrically conductive material are inserted through the connection passages 40 of the mounting elements 4 of the cover element 3, which are enclosed by the walls 4a and each serve as components of an electrical connection between the coils 5 of the electric motor and the inverter. One ring-shaped or hollow-circular-cylinder-shaped slot 10 is produced between the wall 4a of the mounting element 4 and the plug-in connector 9, which is shown, in particular in FIG. 2A. The slot 10 serves for mounting of a contact element 11, produced in the form of a sleeve, and for accommodation of potting compound 12.

The connection lines 8b of the conducting wires 8 of the coils 5 are on their ends 8c and via the contact element 11 electrically connected to a plug-in connector 9 arranged inside a mounting element 4 or the contact element 11, wherein the end 8c of the conducting wire 8 is in both mechanical and electrically conductive contact with the contact element 11 on a first end face of the contact element 11, which is aligned towards the stator 1. The second end face of the contact element 11 is aligned in a direction pointing away from the stator 1 and pointing towards the inverter that is not represented here.

The contact element 11, that is also produced in the shape of a hollow circular cylinder, is arranged in such a way that it encloses the plug-in connector 9 with one inner surface of a lateral surface in full-area electrical contact, wherein the internal diameter of the inner surface of the contact element 11 corresponds essentially to the outer diameter of the hollow-cylinder-shaped plug-in connector 9 or is a little smaller to be able to facilitate press fitting between the plug-in connector 9 and the contact element 11.

The contact element 11 is arranged inside a connection passage of a mounting element 4, wherein the outer diameter of the contact element 11 corresponds essentially to the internal diameter of the wall 4a of the connection passage plus the slot 10 for accommodation of the potting compound 12. Consequently, the potting compound 12 is arranged between the contact element 11 and the wall 4a of the mounting element 4 so as to be able to connect the contact element 11 with the mounting element 4 and thus with the cover element 3.

When fitting the stator 1 and after arranging the individual components, such as the stator core 2 with the insulation element 6 and the conducting wires 8, each with connecting cable 8a and connection line 8b, the cover element 3, as well as the contact element 11 and the plug-in connector 9, the hollow spaces produced between the cover element 3 and the insulation element 6, as well as the walls 4a and the contact elements 11, are filled or grouted with potting compound 12. Since the hollow spaces produce a coherent volume, grouting with the potting compound 12 can be performed as a single process step, wherein the volume 30 enclosed by the ring surfaces 3a, 3b of the cover element 3 and the connection ring, as well as by the reversing sections of the conducting wires 8 wound to produce the coils 5 and the walls 4a of the mounting elements 4 and the contact elements 11 is filled or grouted with potting compound 12 in such a way that the cover element 3 is firmly and inseparably connected both with the insulation element 6 and the conducting wires 8 that are arranged between the cover element 3 and the insulation element 6, as well as with the contact elements 11 or the plug-in connectors 9.

The connecting cables 8a and the connection lines 8b of the conducting wires 8, as well as the plug-in connectors 9 with the contact elements 11 are fully enclosed or covered by potting compound 12 and thus electrically insulated from each other and from adjacent electrically conductive components.

The grouting with the potting compound can alternatively also be performed in separate process steps, wherein the hollow spaces, produced between the contact elements 11 and the walls 4a of the mounting elements 4, are grouted after assembly of the plug-in connectors 9 in the mounting elements 4, in particular the contact elements 11 arranged in the mounting elements 4, inside the already grouted cover element 3, thus insulating the plug-in connectors 9 from each other.

The volume is to be filled with the potting compound 12 up to a certain level which is indicated in FIG. 2C by way of the dotted line so that all areas that are critical for creeping currents are grouted. With grouting of the volume, adjacent, in particular electrically conductive components are insulated from each other in such a way that the formation of creepage distances, also called potential paths, that allow the formation of creeping current or short-circuit currents, is avoided, wherein flow paths or paths for potential creeping currents are interrupted and the extension of the stator 1 with stator core 2, insulation element 6 and conducting wires 8 is minimized, in particular in the direction of longitudinal axis 7. With separation of the current-carrying components from each other and from other electrically conductive components, the requirements with reference to the insulation in the specified voltage range are fully met.

The invention relates to a device for driving a compressor, in particular an electric motor, for compressing a vaporous fluid, specifically a refrigerant. The compressor can be used in a refrigerant circuit of a motor vehicle air-conditioning system. The device exhibits a rotor and a stator which extend along a common longitudinal axis. The stator exhibits connecting cables and connection lines that are produced as sections of conducting wires of coils.

The invention claimed is:

1. A device for driving a compressor of a vaporous fluid, comprising:
   a rotor and a stator with a stator core, which extend along a common longitudinal axis between two end faces, wherein the stator further comprises:
     connecting cables and connection lines, produced as sections of conducting wires of coils that are arranged on a first end face of the stator;
     an insulation element that projects beyond the stator core in an axial direction with an essentially hollow-cylinder shaped wall on the first end face of the stator, wherein the connecting cables and/or the connection lines are arranged around the wall of the insulation element in a circumferential direction;
     a cover element that is provided with mounting elements, each including connection passages for mounting plug-in connectors, each of which is enclosed around their perimeter by a wall that is arranged in contact with the stator core in the axial direction around its perimeter on the first end face of the stator in a way that covers the wall of the insulation element projecting beyond the stator core with the connecting cables and/or the connection lines, wherein a volume enclosed by the stator core, the cover element and the wall of the insulation element which projects beyond the stator core is filled at least in an area with potting compound.

2. The device according to claim 1, wherein reversing sections of the conducting wires wound to produce the coils, aligned in a direction of the first end face of the stator, are covered at least in an area by the cover element and encapsulated in the potting compound.

3. The device according to claim 1, wherein the cover element exhibits a form of a hollow circular cylinder aligned in the axial direction.

4. The device according to claim 1, wherein the cover element is produced as a ring that is closed around its perimeter with two axially aligned ring surfaces and one radially aligned ring surface.

5. The device according to claim 4, wherein the axially aligned ring surfaces that are arranged on an outer radius and on an inner radius of the cover element are aligned parallel to each other and connected to one another via the radial ring surface.

6. The device according to claim 4, wherein the radially aligned ring surface is arranged on a plane aligned vertically to the longitudinal axis and that the axially aligned ring surfaces are each arranged and connected to one another on end faces in such a way that the cover element exhibits a U shape in a cross-section through a contour of the ring.

7. The device according to claim 6, wherein the cover element is arranged in contact with the stator core with one of the end faces of at least one of the axially aligned ring surfaces, the end face of the at least one of the axially aligned ring surfaces is distally aligned with another of the end faces of the axially aligned ring surfaces, wherein the end faces of the axially aligned ring surfaces are connected to the radially aligned ring surface.

8. The device according to claim 4, wherein the ring surfaces are produced in such a way that they are closed over their full circumference.

9. The device according to claim 1, wherein the cover element is produced of an electrically insulating material.

10. The device according to claim 1, wherein the connecting cables and/or the connection lines of the conducting wires are arranged in such a way that they are in contact with an outer surface of the wall of the insulation element.

11. The device according to claim 1, wherein the wall of the insulation element exhibits at least one collar for mounting a connecting cable and/or one connection line, which fully extends in the circumferential direction and is produced as a recess.

12. The device according to claim 1, wherein the plug-in connectors are produced from an electrically conductive material with a cylinder shape and are arranged in such a way that they are passed through a connection passage of a mounting element of the cover element, which is enclosed by the wall of the connection passage.

13. The device according to claim 12, wherein a slot in the shape of a hollow circular cylinder for mounting a contact element and for accommodation of the potting compound is produced between the wall of the mounting element and the plug-in connector.

14. The device according to claim 13, wherein an outer diameter of the contact element corresponds essentially to an internal diameter of the wall of the connection passage plus a slot that is produced around an entirety of a perimeter and intended for accommodation of the potting compound.

15. The device according to claim 13, wherein the ends of the connection lines of the conducting wires are electrically connected via the contact element to a plug-in connector arranged inside the contact element.

16. The device according to claim 15, wherein the end of the conducting wire exhibits an electrically conductive connection to the contact element on an end face of the contact element which is aligned towards the stator.

17. The device according to claim 1, wherein one contact element each in the form of a circular hollow cylinder-shaped sleeve for mounting the plug-in connector is produced inside each plug-in connector, wherein an inner surface of a lateral surface encloses the plug-in connector in such a way that an electrical contact is established.

18. A method for manufacturing the device for driving a compressor of a vaporous fluid according to claim 1, exhibiting the following steps to be followed when fitting the stator:
   arranging the stator core with the insulation element and the conducting wires wound to produce the coils and fitted with the connecting cables and the connection lines that are arranged on the wall of the insulation element which projects beyond the stator core in the axial direction;
   arranging the cover element with the mounting elements, each produced with connection passages that are fully enclosed by the wall on the end face of the stator core aligned in the axial direction, wherein each of the connection passages are produced with one contact element that is electrically connected to one of the connection lines of one of the conducting wires and each of the plug-in connectors is plugged into one of the contact elements,
   at least in an area filling of the volume, which is produced between the stator core, the cover element and the insulation element, as well as the walls of the mounting elements and the contact elements, with the potting compound, and
   arranging the rotor and the stator on the common longitudinal axis, wherein the stator encloses the rotor in the radial direction.

19. The method according to claim 18, wherein a volume enclosed by the cover element and reversing sections of the conducting wires wound to produce coils, which are aligned in the direction of the end face of the stator, is filled at least in the area with the potting compound during the filling process, wherein the volume produced between the stator core, the cover element and the insulation element, and the volume produced between the walls of the mounting elements and the contact elements and the volume enclosed by the cover element and the reversing sections of the conducting wires wound to produce coils, which are aligned in the direction of the end face of the stator, are produced as a coherent volume.

20. A use of a device for driving the compressor, for compressing the vaporous fluid, according to claim 1, for the compressor of a refrigerant in a refrigerant circuit of a motor vehicle air-conditioning system.

* * * * *